Figure 1:
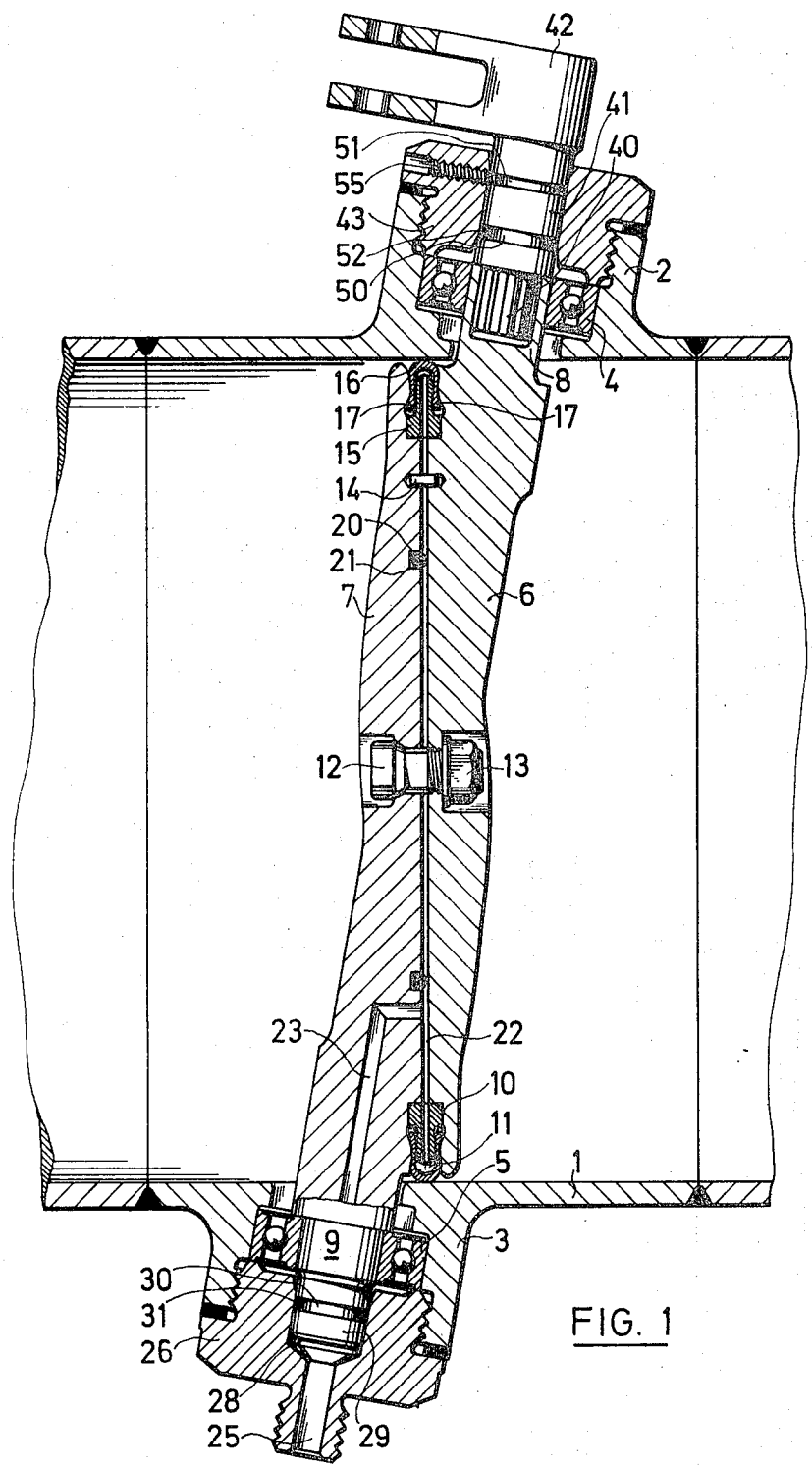

United States Patent [19]
Castriota-Scanderbeg

[11] 3,837,616
[45] Sept. 24, 1974

[54] PIVOTING VALVE

[75] Inventor: George Castriota-Scanderbeg, Winterthur, Switzerland

[73] Assignee: Sulzer Brothers Ltd., Winterthur, Switzerland

[22] Filed: Apr. 11, 1973

[21] Appl. No.: 350,146

[30] Foreign Application Priority Data
Apr. 21, 1972 Switzerland.......................... 5905/72

[52] U.S. Cl..................... 251/30, 251/175, 251/306
[51] Int. Cl........................................... F16k 31/143
[58] Field of Search .............. 251/30, 173, 175, 306

[56] References Cited
UNITED STATES PATENTS

| 1,834,870 | 12/1931 | Rogers | 251/173 |
|---|---|---|---|
| 1,844,641 | 2/1932 | DeWein | 251/173 |
| 2,729,751 | 1/1956 | Westman | 251/30 UX |
| 3,059,897 | 10/1962 | Jensen | 251/306 |
| 3,556,475 | 1/1971 | Oleuik | 251/306 |
| 3,682,436 | 8/1972 | Legille | 251/30 |

FOREIGN PATENTS OR APPLICATIONS

| 1,182,583 | 6/1959 | France | 251/173 |
|---|---|---|---|

*Primary Examiner*—Harold W. Weakley
*Attorney, Agent, or Firm*—Kenyon & Kenyon Reilly Carr & Chapin

[57] ABSTRACT

The valve body is formed of two disc-like portions which are sandwiched together after mounting and which carry an annular inflatable sealing member in bridging relation across a gap between the two portions. A duct is formed in one portion to extend to a pressure medium supply source which is controlled to supply a pressure fluid via the gap to the sealing member to inflate the same into sealing contact in a pipeline.

Control means are provided to deflate the sealing member prior to opening of the valve and to inflate the sealing member after closing of the valve.

10 Claims, 2 Drawing Figures

PIVOTING VALVE

This invention relates to a pivoting valve and to a control means for a pivoting valve.

Heretofore, pivoting valves have been known for closing a circular aperture, such as that in a pipe, in a gas-tight manner wherein the pivot axis of the valve is oblique to the cross-section of the aperture. Existing pivoting valves of this type are used, for example, as gas-tight closures for pressure equalizing apertures in pressure vessels belonging to nuclear power stations. Generally, because of the danger of radioactive contamination, very high standards are set for the impermeability of these valves to gas. A particular advantage of these valves is that a seal which acts radially around the valve circumference can be continuous over the entire circumference and need not be interrupted to allow passage of the pivot for the valve.

In one type of known valve construction, sealing members have been disposed radially on the valve circumference and have been pressed onto a slightly oblique valve seat. However, since the sealing members are subject to wear due to friction when the valve opens or closes, means must be provided for periodically readjusting the seals, which seals act radially outwards.

In other constructions, the sealing members have been mounted in the surface defining the associated pipe-type aperture, instead of in the movable valve body. However, valves of this type provide a reliable seal only if the valve is pivoted completely. Thus, these valves have been somewhat unreliable in operation, particularly for use in pressure vessels in nuclear power stations.

Furthermore, in many cases, it has been difficult to install these previously known pivot valves in a pipe-like aperture or to install the seal in the valve or in the pipe wall.

An object of the invention is therefore to provide a pivot valve which is highly reliable in operation.

It is another object of the invention to provide a valve body for a pivot valve which is economical to manufacture.

It is another object of the invention to provide a valve body which can be easily installed in a pipeline.

It is another object of the invention to provide a valve body which can receive an easily-installed sealing member.

Birefly, the invention provides a valve body made of two disc-like portions of substantially identical shape which are disposed in facing relation and jointly carry an inflatable resilient sealing member in bridging relation, for example, in a circumferential peripheral recess in each portion. In addition, each valve body portion carries a trunnion-like extension which is adapted to fit through a suitable hole in, for example, a valve housing which defines a circular opening for a flow. A duct is also formed in one of the valve body portions in order to supply a pressure fluid to the sealing member to inflate the sealing member when the valve body is in a closed position and to discharge the pressure fluid when the valve body is to be moved to an open position. The duct is placed in communication with the sealing member in any suitable manner, for example, by means of a gap between the two disc-like portions.

Because the valve is in two parts, each portion can be inserted individually by means of its trunnion-like extension into a bearing provided in the valve housing for pivoting of the valve. The connection of the two portions together can then take place inside the housing. In addition, the sealing member can be mounted in place on one portion before the other portion is put in place and the connection made. These factors reduce the cost of installing and assembling the valve.

Economical manufacture is also promoted by the substantially identical shape of the two disc-like portions. The same mold or die can be used for both valve portions, irrespective of whether they are cast or drop-forged.

Once assembled, there is no need to readjust the sealing member. A satisfactory seal can be ensured merely by altering the pressure of the pressure fluid. Thus, reliability and sealing efficiency are considerably high.

Installation of the inflatable sealing member in the pivotal valve body also has other advantages over a similar installation in a fixed surface defining a pipe-like aperture. First, the resilient sealing member is subjected to tension when installed on the valve body and is therefore urged into place due to its resilience. This reduces the risk of detachment of the sealing member from its mounting. Second, an inflatable sealing member of this kind seals satisfactorily even if the valve is not completely closed, for example, if the valve has carried out only 99 percent of its closing movement.

Installation of the sealing member is considerably facilitated if this member is retained on a ring inserted between the two disc-like portions of the valve body.

In order to reduce stressing of the connection joining the two valve portions, the gap between the disc surfaces may contain an O-ring which is radially spaced relative to the valve center to seal off an annular portion of the gap from a central portion of the gap. This considerably reduces the gap area subjected to the pressure fluid and also provides a simple means of preventing the pressure fluid from escaping into one of the spaces upstream and downstream of the valve.

In order to prevent damage to the sealing member during opening and closing the valve and also to ensure a reliable gas seal, it has been found advantageous to release the pressure in the pressure chamber of the sealing member before the valve opens and to delay supplying pressure fluid to the pressure chamber until after the valve has closed. Further, in order to carry out these operations in sequence in a simple manner use is made of interlocking means which permit the second step in the sequence only after the performance of the first step has been reported. Generally, interlocking means of this kind are complicated and expensive. However, this drawback can be advantageously alleviated if the valve is provided with a final control means for the valve and a control means for the pressure fluid, both of which are controlled by means of a common switch, as well as a first means between the switch and the final control means and a second means between the switch and the control means for the pressure fluid in which the first means acts as a delay means in the event of an OPEN VALVE signal and acts without any delay in the event of a CLOSE signal, whereas the second means acts immediately in the event of an OPEN signal and as a delay means in the event of a CLOSE signal.

If the final control means and pressure-fluid control means are electropneumatic, it may be advantageous, for example, if an actuating piston for the valve and the pressure chamber of the inflatable seal can be connected in parallel by way of respective electromganetically controllable spools to a pressure fluid source and to a pressure fluid discharge line. In this case, the final control means is connected to the pressure fluid discharge line and the control means for the pressure chamber to the pressure fluid source when the valve is closed, and the electromagnet actuating means for the spools are connected in parallel by way of the switch and by way of the means associated with them to an electrical power supply.

In order to use the valve for nuclear installations, it is advantageous for safety reasons if the spool of the control means is provided with means for ensuring that the associated control function delay remains effective even if the power supply fails, and if a pressure fluid reservoir is provided in the pressure fluid supply line leading from the pressure fluid source. When the valves are used in nuclear installations, it is also advantageous to connect a plurality of valves in series and in parallel to build up a redundant system, and also to arrange the various controls in the valves themselves as redundant systems.

Figure 2:
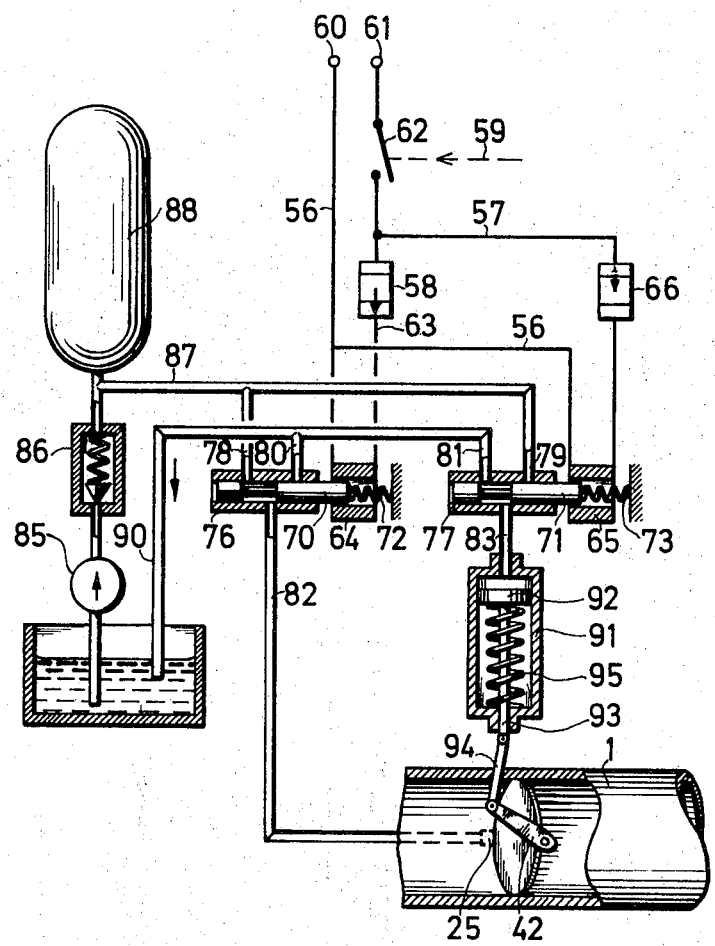

These and other objects and advantages of the invention will become more apparent from the following detailed description and appended claims taken in conjunction with the accompanying drawings in which:

FIG. 1 illustrates a cross-sectional view of a valve body according to the invention in a pipe; and FIG. 2 illustrates an electropneumatic control system according to the invention for the valve.

Referring to FIG. 1, a pipe portion 1 which acts as a valve housing is provided with two bosses 2, 3 slightly offset axially and containing respective ball bearings 4, 5. The ball bearings serve to pivotally mount a valve body within the pipe portion 1 in an oblique manner. To this end, the bearings 4, 5, which are aligned along an inclined pivot axis which intersects the pipe axis, receive a trunnion-like extension 8 or 9 connected to a disc-like portion 6 or 7, respectively of the valve body.

The portions 6, 7 are screwed tightly together in the central regions of each by means of a screw 12 and nut 13. A ring 15 is clamped in a peripheral recess 10 between the portions 6 and 7, and an annular, inflatable sealing member 16 of omega-shaped cross-section is pushed onto this ring 15 to define a chamber 11 while the ring 15 is provided with bores to communicate the chamber 11 within the interface area between the portions 6, 7. The edges 17 of the sealing member 16 bulge so as to be clamped firmly between the portions 6, 7 and ring 15.

One of the disc surfaces on the portions 6, 7 contains a circular groove 20 concentric with the screw 12 and containing an O-ring 21. A gap 22 is thus formed between the portions 6 and 7 and within the ring 15 in the recess 10 which is divided into two circular chambers by the O-ring seal 21. The outer annular chamber of the gap 22 is supplied with a pressure fluid through a duct 23 running through the trunnion-like extension 9 of the portion 7. The pressure fluid is supplied through a connection 25 in a cap 26 which also acts as an axial abutment for the ball bearing 5. A cylindrical recess 28 machined into the cap 26 receives a spigot 29 belonging to the extension 9. The spigot 29 contains a groove 30 for an O-ring 31 which seals off the pressure fluid supply from the spaces adjacent to the valve.

The extension 8 of the portion 6 is provided with internal coaxial splining which meshes with external splining on a spigot 40, which is mounted on a lever 42 by way of a stem 41. The stem 41 is rotatably mounted in a cap 43 and contains two grooves 50, 51. One groove 50 contains an O-ring seal 52 while the other groove 51 receives a pilot grub screw 55 inserted in the cap 43.

In order to install the valve in the pipe portion 1, the portions 6, 7 are first pushed separately by means of their extensions 8, 9 into the holes in the bosses 2, 3 respectively. One of these portions 6, 7 carries the ring 15 in the recess 10 with the sealing member 16 clamped thereon. The O-ring 21 is also previously placed in the groove 20 prior to installation of the portions 6, 7.

The disc surfaces on the portions 6, 7 are now positioned correctly relative to one another and connected rigidly together by means of the screw 12 and nut 13. To ensure that the extensions 8, 9 take up exactly coaxial positions, a dowel pin 14 is positioned to engage in the portions 6, 7. The ball bearings 4, 5 are now inserted.

Installation is then completed by screwing the caps 26 and 43 on to the bosses 2, 3, by sealing the extensions 8, 9 relative to the atmosphere and by connecting the extensions 8, 9 to a control means and pressure fluid line.

Referring to FIG. 2, in order to operate the valve, an electropneumatic control system for final control (i.e., positioning) of the valve and for the supply and discharge of the pressure fluid to and from the pressure chamber 11 in the sealing member 16 is provided. As shown, this system includes a main electrical power supply having terminals 60, 61, from one of which a pair of lines 56 lead directly to magnet coils 64, 65. The other terminal 61 is connected to a switch 62 and thence by way of a line 57 and a first control-function-delaying element or means 66 to the coil 65 and by way of a line 63 containing a second control-function-delaying element or means 58 to the coil 64. The first element 66 operates with a delayed switch-on function but a no-delay switch-off function while the second element 58 operates with a reverse pattern.

The ends of the two spools 70, 71 enter the coils 64, 65 and are biased by springs 72, 73 so that when the coils 64, 65 are not energized, the spools 70, 71 are urged by the springs 72, 73 into the left-hand limit position as illustrated. The two spools 70, 71 are housed in respective casings 76, 77 to which respective feed lines 78, 79, discharge lines 80, 81 and connecting lines 82, 83 are connected to form respective electromagnetically controlled spool valves.

The feed lines 78, 79 communicate by way of a distributing line 87 and non-return valve 86 with a blower 85. The line 87 is also provided with a compressed air reservoir 88 such that either of the blower 85 or reservoir 88 acts as a pressure fluid source. The discharge lines 80, 81 lead into a header 90, but might alternatively lead direct to the atmosphere.

The connecting line 83 from the casing 77 of the spool 71 ends in the pressure chamber of a servo motor 91, having a piston 92 biased by a spring 95. The piston acts by way of its rod 93 and a link 94 on the lever 41 of the pivoting valve situated in the pipe aperture 1. The second connecting line 82 leads from the casing 76 of the spool 70 to the connection 25 for the pressure chamber 11.

As FIG. 2 shows, while the coils 64, 65 are not energized the connecting line 82 to the pressure chamber 11 communicates with the pressure fluid feed line 78, while the connecting line 83 to the pressure chamber of the servo motor 91 communicates with the discharge line 81.

While the spools are energized, the spools 70, 71 are in the right-hand limit position, the springs 72, 73 being compressed, and there is a pneumatic connection between the pressure feed line 79 to the casing 77 and the connecting line 83, and between the discharge line 80 from the casing 76 and the connecting line 82.

The control system operates as follows.

In the condition illustrated, the pressure chamber of the servo motor 91 is relieved of pressure by way of the line 81, and the piston 92 is urged by the spring 95 onto a stop (not shown) so that the valve is fixed in a closed position. At the same time, the pressure chamber 11 inside the sealing member 16 is supplied with compressed air from the blower 85 by way of the non-return valve 86, distributing line 87 and spool 70.

In order to obtain the pivoting valve, the electrical circuit to the coils 64, 65 is closed by means of the switch 62, which in turn is operated from outside by way of a signal line 59, for example by a differential pressure gauge (not shown). The switch 62 causes the coil 64 to be energized without delay, since the element 58 operates only with a delayed switch-off function. The fluid maintaining the contact pressure in the pressure chamber 11 is therefore discharged along the discharge line 80 as soon as a connection is made between the lines 80 and 82. The spool 71 is then automatically attracted by means of the delay element 66, which operates with a delayed switch-on function, so that pressure fluid flows along the lines 87, 79 and 83 into the servo motor 91. As a result, the piston 92 descends, counteracting the spring 95, and opens the valve by way of the piston rod 93 and link 94.

In order to close the valve, the current supply to the coils 64, 65 is interrupted. This immediately releases the pressure in the servo motor 91 so that the spring 95 brings the valve into the closing position, since the delay element 66 provides only a delayed switch-on. The current supply to the coil 64, however, is maintained by the element 58 (which provides only delayed switch-off) until the valve has closed. After the period set in the element 58, the spring 72 is allowed to bring the spool 70 into the position illustrated. Thus, the pressure chamber 11 of the sealing member 16 is refilled with pressure fluid by way of the lines 87, 78 and 82.

When the coils 64, 65 are not energized for any reason, including failure of the main supply, the spring 95 brings the valve into the closed position and the pressure chamber 11 is simultaneously supplied with pressure fluid. Thus, the required gas seal is maintained irrespective of power failures. If a power failure occurs while the valve is open, an auxiliary power means, for example, a battery (not shown) independent of the mains, may be provided to ensure that the delay element 58 remains effective.

The electrical system may, of course, operate the other way round, that is, the pneumatic system may be in the condition illustrated while the switch 62 is closed, and the switch 62 may be opened to open the valve. Such a system operates in a manner similar to that described above, except that the element 58 must provide only delayed switch-on and the element 66 only delayed switch-off. Compared with the system illustrated, however, it may be a disadvantage that a mains failure necessitates emergency power supplies for this variant, if the valve must be closed in the event of a breakdown.

The reservoir 88 is made large enough for the contained reserve of pressure fluid to maintain the pressure in the pressure chamber of the sealing member 16 for approximately 24 hours if the blower 85 fails.

The pneumatic system may differ from that shown in FIG. 2 in that the valve is held closed by compressed air in the servo motor 91 and opened by the spring 95. This variant, also, has disadvantages over the embodiment described and illustrated. First, compressed air is required to keep the valve closed. Second, as is well-known, the impermeability of the system is often not complete, particularly at the piston 92 of the servo motor 91, so that this variant would suffer continual compressed air losses and the reservoir 88 would empty faster if the blower 85 failed.

What is claimed is:

1. A pivoting valve comprising
   a housing having a circular opening; and
   a valve body disposed on a pivot axis oblique to the cross-section of said opening, said valve body including two disc-like portions of substantially identical shape disposed in facing relation, each said portion having a circumferential peripheral recess and a trunnion-like extension extending into said housing, an inflatable resilient sealing member sealingly disposed in each said recess in bridging relation to said portions, and a duct in one of said portions extending through said extension thereof into communication with said recess thereof for supplying and discharging a pressure fluid for the inflation of said sealing member.

2. A valve as set forth in claim 1 which further comprises a ring disposed in each recess of said portions with said sealing member retained thereon.

3. A valve as set forth in claim 1 wherein said portions are in spaced relation to define a gap therebetween and said duct communicates with said gap.

4. A valve as set forth in claim 3 which further comprises an annular O-ring in sealing relation between said portions to seal an annular portion of said gap from a central portion of said gap, said annular gap portion being in communication with said duct.

5. A valve body for a valve comprising
   two disc-like portions of substantially identical shape disposed in facing relation, each portion having a circumferential peripheral recess and a trunnion-like extension extending outwardly thereof,
   an inflatable resilient sealing member sealingly disposed in each said recess in bridging relation to said portions, and
   a duct in one of said portions extending through said extension thereof into communication with said recess therein for supplying and discharging a pressure fluid for the inflation of said sealing member.

6. In combination,
   a pivotal valve body having a pair of disc-like portions disposed in facing relation, an inflatable resilient sealing member sealingly disposed in bridging relation to said portions and a duct passing through one of said portions to communicate said sealing member;

a first control means for pivoting said valve body between a closed position and an open position;

a second control means for supplying a pressure fluid into said duct to inflate said sealing member and for discharging pressure fluid from said duct;

a common switch connected to each said control means to emit a signal to each said control means to selectively actuate each said control means;

a first means between said switch and said first control means for actuating said first control means with a delay in response to said signal to delay pivoting of said valve body from said closed position to said open position; and a second means between said switch and said second control means for actuating said second control means in response to said signal to discharge pressure medium from said sealing member.

7. The combination as set forth in claim 6 wherein said first means actuates said first control means in response to an absence of said signal to pivot said valve body immediately from said open position to said closed position, and said second means actuates said second control means in response to an absence of said signal to supply pressure medium after a delay to said sealing member.

8. The combination as set forth in claim 6 which further comprises a pressure fluid source and a pressure fluid discharge line; and wherein each control means is an electropneumatic mechanism, said first control means including an actuating piston for pivoting said valve body and a first electromagnetically controlled spool valve pneumatically connected between said actuating piston and a selective one of said pressure fluid source and said pressure fluid discharge line, said first means being connected to said first spool valve to selectively open said spool valve to one of said source and said discharge line; said second control means including a second electro-magnetically controlled spool valve pneumatically connected between said duct in said valve body and a selective one of said pressure fluid source and said pressure fluid discharge line, said second means being connected to said second spool valve to selectively open said spool valve to one of said source and said discharge line; said spool valves being actuated to cause pneumatic connection of said pressure fluid source to one of said actuating piston and said duct and said discharge line to the other of said actuating piston and said duct.

9. The combination as set forth in claim 8 further comprising a main power supply connected to said spool valves to actuate said spool valves and an auxiliary power means connected to said second spool valve to actuate said second spool valve upon failure of said main power supply.

10. The combination as set forth in claim 8 wherein said supply line connects said pressure fluid source to said spool valves and a pressure fluid reservoir is connected to said supply line.

* * * * *